(12) United States Patent
Zhang et al.

(10) Patent No.: US 8,460,444 B2
(45) Date of Patent: Jun. 11, 2013

(54) EQUIPMENT FOR PRESSURIZED ADSORPTION OF GASEOUS CARBON DIOXIDE FROM BOILER FLUE GAS FOR OIL RECOVERY BY WELL INJECTION

(75) Inventors: Fengshan Zhang, Panjin (CN); Yuanwen Gao, Panjin (CN)

(73) Assignee: Liaohe Petroleum Exploration Bureau, CNPC, Panjin (CN)

( * ) Notice: Subject to any disclaimer, the term of this patent is extended or adjusted under 35 U.S.C. 154(b) by 1061 days.

(21) Appl. No.: 11/940,168

(22) Filed: Nov. 14, 2007

(65) Prior Publication Data
US 2008/0236811 A1 Oct. 2, 2008

(30) Foreign Application Priority Data
Mar. 30, 2007 (CN) .................. 2007 2 0011439 U

(51) Int. Cl.
*E21B 43/18* (2006.01)
*B01D 53/04* (2006.01)

(52) U.S. Cl.
USPC ............... 96/121; 96/361; 96/365; 166/267; 166/402; 166/90.1

(58) Field of Classification Search
USPC ............ 95/160, 166, 169, 172, 177, 199, 95/236, 92; 96/234, 121, 134, 243, 290, 361, 96/365; 62/606, 617; 166/267, 402, 266, 166/90.1; 423/226, 228, 229
See application file for complete search history.

(56) References Cited

U.S. PATENT DOCUMENTS

| | | | |
|---|---|---|---|
| 3,594,985 A * | 7/1971 | Ameen et al. | 95/163 |
| 3,929,434 A * | 12/1975 | Nelson | 95/236 |
| 4,546,829 A * | 10/1985 | Martin et al. | 166/267 |
| 4,552,570 A * | 11/1985 | Gravatt | 95/10 |
| 5,061,465 A * | 10/1991 | Carter | 423/229 |
| 5,122,355 A * | 6/1992 | Prasad et al. | 423/351 |
| 6,148,535 A * | 11/2000 | Porter | 34/80 |
| 7,341,102 B2 * | 3/2008 | Kresnyak et al. | 166/267 |
| 7,588,612 B2 * | 9/2009 | Marwitz et al. | 55/356 |
| 2003/0037928 A1 * | 2/2003 | Ramachandran et al. | 166/305.1 |
| 2005/0087340 A1 * | 4/2005 | Zupanick et al. | 166/245 |
| 2007/0256559 A1 * | 11/2007 | Chen et al. | 95/169 |
| 2009/0148930 A1 * | 6/2009 | Gal et al. | 435/264 |

* cited by examiner

Primary Examiner — Frank Lawrence, Jr.
(74) Attorney, Agent, or Firm — Morrison & Foerster LLP

(57) ABSTRACT

An equipment for the pressurized adsorption of gaseous carbon dioxide from boiler flue gas for oil recovery by well injection comprising a boiler for generating high pressure steam, a high pressure water pump, a tower scrubber, a compressor, an absorber, a separation tank, a flash pot, a solvent pump, a stripper, an air pump, a carbon dioxide compressor, a purifier, a carbon dioxide pressurizer, a drying beds, a membrane module, a nitrogen pressurizer and a mixing tank. With rational design and handsome practicability, the comprehensive mate equipment, when producing steam by the boiler, can obtain carbon dioxide liquid and nitrogen, thus realizing "single injection", "double injection" or "triple injection" of steam, gaseous carbon dioxide and nitrogen and thereby gaining favorable results of crude oil output increase as well as environment protection.

9 Claims, 1 Drawing Sheet

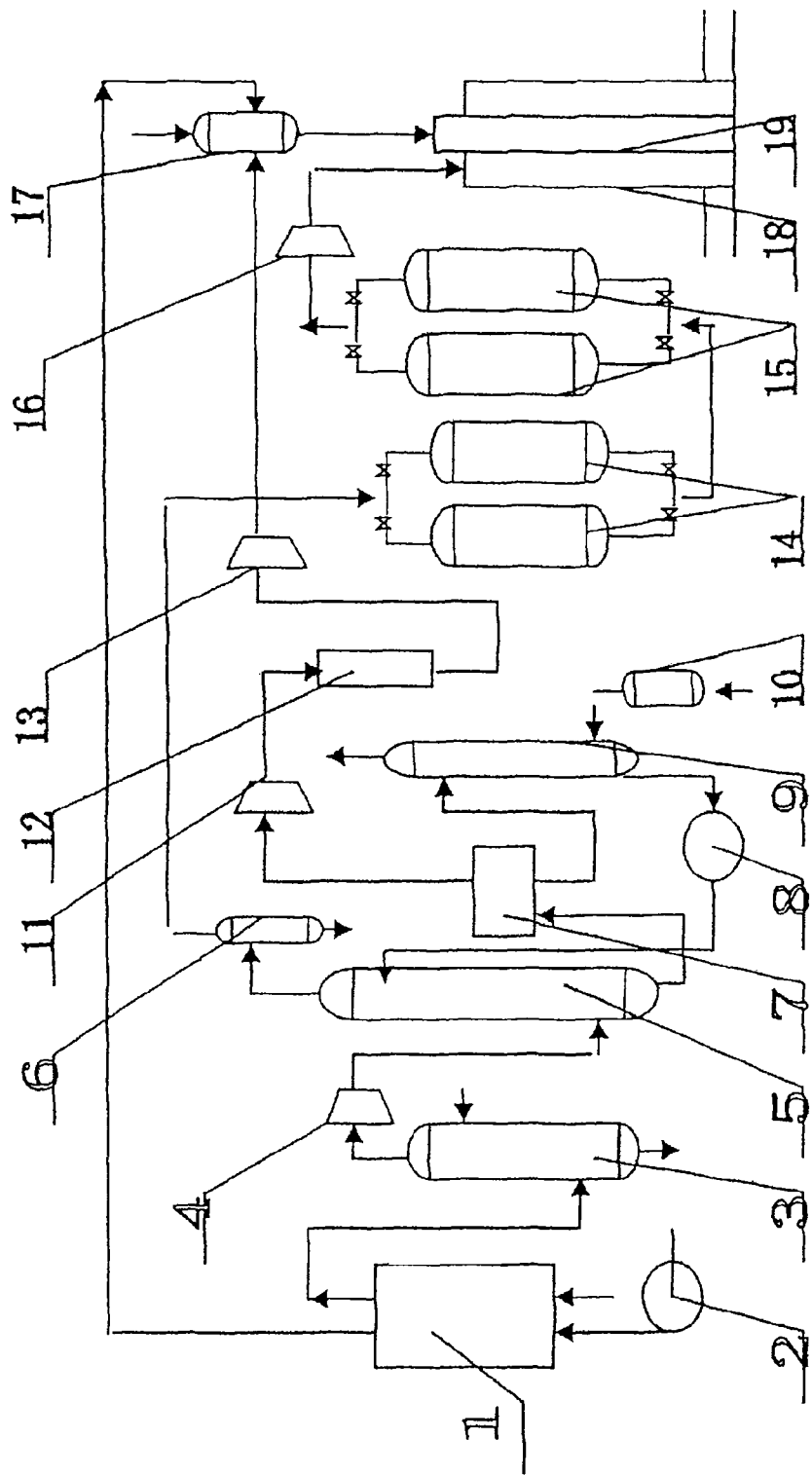

EQUIPMENT FOR PRESSURIZED ADSORPTION OF GASEOUS CARBON DIOXIDE FROM BOILER FLUE GAS FOR OIL RECOVERY BY WELL INJECTION

FIELD OF THE INVENTION

This invention relates to an equipment for oil recovery, especially for the reclaim of boiler flue gas and mated with thick crude oil (or called "dense" crude oil) recovery by steam injection, particularly an equipment for the separation and purification of gases as well as for the pressurized adsorption of gaseous carbon dioxide from boiler flue gas for oil recovery by well injection.

BACKGROUND OF THE INVENTION

In oil fields, the reservoir bed belonging to the continental facies bears considerable heterogeneity during the process of sedimentation. Part of the crude oil containing water has fast rising velocity for its high viscosity. In addition, the exploitation of many oil fields has entered into the middle or later period: though a series of measures such as water or steam injection have been taken, the recovery efficiency of crude oil is still low, the exploitation cost is high, and a lot of original oil in-place is difficult to or even cannot be exploited economically. Worse still, the recovery efficiency is even lower while the cost is even higher with regard to low permeable oil, thick crude oilthick crude oil as well as crude oil of condensate gas reservoirs. In current technologies, gases for tests of oil recovery by gas injection mainly include steam, carbon dioxide and nitrogen.

In the prior art, natural gas injection into the oil field is also one of the commonly used methods for oil recovery. Fairly favorable results can be obtained for the following reason: natural gas possesses some properties of crude oil in oil reservoirs and would not cause any harm to the oil bed; consequently, miscibility can be obtained under relatively low pressures or in the process of flooding. However, the technology is, to a certain extent, restricted by economic factors for the rising price of gas hydrate (including natural gas), which, as a result, motivates the studies on the injection of other gases, especially carbon dioxide and nitrogen.

It is an effective approach to improve the exploiting effect of oil fields and increase oil recovery efficiency to flood carbon dioxide and/or nitrogen into the oil fields on the basis of traditional steam injection. Having high solubility in both water and oil, carbon dioxide, when solved into crude oil in huge amount, can expand the volume as well as decrease the viscosity of the crude oil. During the process of miscible flooding, carbon dioxide extracts and gasifies the light components contained in the crude oil, and in this way the interfacial tension is reduced and flooding is carried out. Meanwhile, carbon dioxide bears the excellent functions of improving mobility ratio, extracting and gasifying light hydrocarbons in crude oil as well as increasing, by molecular diffusion, the permeability of oil reservoirs, etc.

Flue gas of combustors such as boilers etc. consists of carbon dioxide and nitrogen, two key and economical gases for oil recovery by gas injection. With coal, gas or oil as the fuel, combustors including boilers used in oil fields usually produce flue gas containing 9%~15% carbon dioxide (by volume), 0%~85% nitrogen (by volume) and slight quantity of oxygen, sulfur dioxide and water.

Reclaim of carbon dioxide from flue gas of coal, gas or oil boilers may protect the environment and realize environment-friendly production. As the dominating component of greenhouse gases, carbon dioxide exerts non-negligible negative influence on the global ecological system, on the economic development as well as on the health and life quality of human beings. A critical point for minimizing the greenhouse effect is to restrict the content of carbon dioxide in the atmosphere. Therefore, reclaim of carbon dioxide has tremendous significance, considered from the viewpoint of tackling the greenhouse effect problem. Therefore, it is of great significance to reclaim carbon dioxide from flue gas of combustor so as to apply it in gas injection oil producing technology, which may not only increase the crude oil output but also reduce pollution to the environment.

Nitrogen has low solubility in water and the similar viscosity as methane for its larger compressibility and formation volume factor than other gases. As an inert gas, it has no toxicity or corrosivity or flammability; mixture of nitrogen with most of fluids always presents in the phase of cystose, which may have certain lifting influence on the fluids. The above properties enables nitrogen to improve the recovery efficiency of oil by various flooding modes such as immiscible flooding, miscible flooding, gravity flooding, combination flooding and water-gas alternating flooding, etc.

Thermal recovery has dominated the exploitation mode of some thick crude oilthick crude oil blocks in some oil fields. Take wet steam generator (23 ton thermal recovery boiler) for example: with natural gas as the fuel, each boiler discharges approximately 480 million Nm$^3$ of flue gas per year, which, if used as the proximal gas resource of carbon dioxide and nitrogen, may drastically lower the oil recovery cost and provide optimal resources for oil recovery by flue gas injection.

Gas injection into the oil well is an important technology for improving the oil recovery efficiency by reducing interfacial tension, lowering the viscosity of crude oil and restoring or maintaining the reservoir pressure when gases and crude oil form into immiscible or miscible phase for different gases and under different reservoir conditions.

The primary components of flue gas of steam-injection boilers, in the process of thermal recovery of thick crude oilthick crude oil by steam injection, are carbon dioxide and nitrogen. As is presented by studies, combination of steam boilers and mate flue gas reclaim equipment may realize the selective injection of steam, carbon dioxide, nitrogen or their mixture, which not only acquires satisfactory results of outcome increase but also is conducive to the environment protection.

Unfortunately, for various reasons, in the prior art, oil recovery by $CO_2$ or $N_2$ is in the pre-feasibility study period as a single technology and mature technology or equipment has not been developed yet.

SUMMARY OF THE INVENTION

The object of the invention is to provide an equipment for the reclaim of carbon dioxide and nitrogen for oil recovery by gas injection while oil is being produced by steam injection.

To achieve the object, the invention, in its first aspect, provides an equipment for the pressurized adsorption of gaseous carbon dioxide from boiler flue gas for oil recovery by well injection. The equipment comprises a boiler for generating high pressure steam, a tower scrubber, an absorber, a flash pot, a purifier, a carbon dioxide pressurizer, a mixing tank and a down-hole gas injection tube, wherein:

the flue gas outlet at the top of the boiler connects with the tower scrubber by pipelines; the steam outlet at the top of the boiler connects with the mixing tank; tower scrubber connects with the carbon dioxide absorber by pipelines; the outlet at the bottom of the absorber connects with the flash pot by pipelines; the flash pot connects with the purifier by pipelines; and the mixing tank connects with a down-hole gas injection tube by well head pipelines.

The invention in its second aspect, provides an equipment for the pressurized adsorption of gaseous carbon dioxide from boiler flue gas for oil recovery by well injection. The equipment comprises a boiler for generating high pressure steam, a high pressure water pump, a tower scrubber, a compressor, an absorber, a separation tank, a flash pot, a solvent pump, a stripper, an air pump, a carbon dioxide compressor, a purifier, a carbon dioxide pressurizer, drying beds, a membrane module, a nitrogen pressurizer and a mixing tank, wherein:

the bottom of the boiler connects with the high pressure water pump by water-supplying pipes; the flue gas outlet at the top of the boiler connects with the tower scrubber by pipelines; the steam outlet at the top of the boiler connects with the mixing tank by pipelines; tower scrubber connects with the absorber by pipelines, and between them is equipped the compressor; the outlets at the top and the bottom of the absorber connect respectively with separation tank and flash pot by pipelines; the flash pot connects respectively with the purifier and stripper by pipelines; between the flash pot and the purifier is equipped the carbon dioxide compressor; the stripper connects with the absorber by the solvent pump and pipelines, and the other side of the stripper connects with the air pump; the separation tank connects with the drying beds by pipelines; the drying beds connect with the membrane module by pipelines; the mixing tank connects with a down-hole gas injection tube by well head pipelines; and the membrane module connects with a well casing by the nitrogen pressurizer and pipelines.

In the aforesaid equipment for the reclaim of carbon dioxide from boiler flue gas as well as for the liquification of the reclaimed carbon dioxide for well injection oil recovery, the adsorption liquid adopted in absorber may be a mixed liquid of one or more solvents selected from the group consisting of polyethylene glycol dimethyl ether, trimethylether, tetramethylene sulfone, propylene carbonate and low temperature methanol, or may be a mixed liquid of one or more solvents selected from the group consisting of monoethanolamine, methyldiethanolamine, oxidation inhibitor and corrosion inhibitor.

When the boiler is running, the produced steam may be directly injected into the thick crude oil well from the well head through steam transmission pipelines; the flue gas, after scrub, compression, adsorption and flash evaporation within the above process flow of the equipment, may produce a 98% (purity) concentration of carbon dioxide gas, which may be injected into the oil well after pumped. The end gas, after dried and absorbed, may produce a 96% (purity) concentration of nitrogen, which may be injected into the oil well after pressurized. The steam, carbon dioxide liquid and nitrogen obtained from the boiler may be matched and injected into the well, thereby achieving the object of increasing the crude oil output.

With rational design and handsome practicability, the comprehensive mate equipment, when producing steam by the boiler, can obtain carbon dioxide liquid and nitrogen, thus realizing "single injection", "double injection" or "triple injection" of steam, gaseous carbon dioxide and nitrogen and thereby gaining favorable results of crude oil output increase as well as environment protection.

DESCRIPTION OF THE FIGURES

The appended FIGURE is the diagram of the process flow and the overall structure of the invention. In the FIGURE, marks "18" and "19" refer respectively to well casing and gas injection tube for oil recovery.

PREFERRED EMBODIMENTS OF THE INVENTION

Given by the following implementary example, the invention is specified with reference to the appended FIGURE.

As is demonstrated by the FIGURE, the equipment provided by the invention for the pressurized adsorption of gaseous carbon dioxide from boiler flue gas for oil recovery by well injection comprises a boiler 1 for generating high pressure steam, a high pressure water pump 2, a tower scrubber 3, a compressor 4, an absorber 5, a separation tank 6, a flash pot 7, a solvent pump 8, a stripper 9, an air pump 10, a carbon dioxide compressor 11, a purifier 12, a carbon dioxide pressurizer 13, drying beds 14, a membrane module 15, a nitrogen pressurizer 16 and a mixing tank 17.

The structure, assembly and installment of the equipment provided by the invention for the pressurized adsorption of gaseous carbon dioxide from boiler flue gas for oil recovery by well injection are as follows:

The bottom of the boiler 1 connects with the high pressure water pump 2 by water-supplying pipes; the steam outlet at the top of the boiler 1 connects with the mixing tank 17; the flue gas outlet at the top of the boiler 1 connects with the tower scrubber 3 by pipelines; the tower scrubber 3 connects with the absorber 5 by pipelines interposing with the compressor 4.

The boiler 1 is used for producing high pressure steam.

As to boiler 1, the inner tubes may be high pressure channels able to produce pressure of over 15 MPa; the fuel may be coal, crude oil or flammable gases; purified water for production is provided by the high pressure pump 2 with pressure of over 15 MPa.

The tower scrubber 3 is used for the removal of sulfur dioxides and dusts in the flue gas.

The tower scrubber 3 is a packing tower. The packing material may be made of metals, plastics or ceramics as well as of charcoal, minerals or vegetable silk. The eluant may be water, alkalescent solution such as natrium carbonicum solution or ammonia water etc. as well as sulfite solution.

The flue gas is washed in tower scrubber 3 to remove the contained sulfur dioxide and solid particles and then enters into absorber 5.

The outlets at the top and the bottom of the absorber 5 connect respectively with the separation tank 6 and the flash pot 7 by pipelines; the flash pot 7 connects respectively with the purifier 12 and stripper 9 by pipelines; between the flash pot 7 and the purifier 12 is equipped the carbon dioxide compressor 11; the stripper 9 connects with the absorber 5 by the solvent pump 8 and pipelines, and the other side of the stripper connects with the air pump 10.

The absorber 5, the flash pot 7, the solvent pump 8 and the stripper 9 compose a carbon dioxide reclaim system, in which:

the carbon dioxide adsorption liquid is introduced into absorber 5 from the top down. The adsorption liquid is used for absorbing the carbon dioxide contained in the boiler flue gas, which has been compressed by the compressor 4. The invention may use carbon dioxide adsorption liquid commonly known to technicians in the art;

the flash pot 7 has lower pressure than absorber and is used for desorbing the carbon dioxide contained in the solvents coming from the absorber 5. The desorbed carbon dioxide is sent from the top of the flash pot 7 to carbon dioxide the compressor 11, and after compressed, sent to the purifier 12;

the stripper is used for regenerating, with the compressed air from air pump 10, the adsorption capability of the solvents coming from the flash pot 7 and containing slight amount of carbon dioxide. Its working mechanism is to release, with the compressed air from the air pump 10, the carbon dioxide remaining in the solvent and discharge the released carbon dioxide with the compressed air from the outlet at the top of the stripper 9; and the solvent pump 8 is used for sending the solvents, whose adsorption capability has been regenerated in the stripper 9, back to the absorber 5 for reuse.

The aforesaid solvents (or referred to as adsorption liquid) may be a mixed liquid of one or more solvents selected from the group consisting of polyethylene glycol dimethyl ether, trimethylether, tetramethylene sulfone, propylene carbonate and low temperature methanol, or a mixed liquid of one or more solvents selected from the group consisting of monoethanolamine, methyldiethanolamine, oxidation inhibitor and corrosion inhibitor.

The purifier 12 is composed of two twin purifying beds packed with solid packing materials including aluminium oxide, silica gel, activated carbon or molecular sieve.

With the equipment of the invention, the content of carbon dioxide coming out from the purifier 12 may reach as high as 99.9%. That is to say, carbon dioxide with high purity may be gained successfully.

The highly pure carbon dioxide is sent to the carbon dioxide pressurizer 13, where it is pressurized, and then to the mixing tank 17, where it is mixed with pressurized nitrogen and/or pressurized steam, and then injected into the oil well.

Depicted above is the flow of reclaim of carbon dioxide from boiler flue gas according to the present invention.

Depicted below will be the flow of reclaim of nitrogen from boiler flue gas according to the present invention.

Because of the absorbing effect of absorber 5, the gas coming out from the top of the absorber 5 basically contains no carbon dioxide. It is mostly nitrogen accompanied by slight quantity of oxygen and slimsy liquid and gas water. The said gas coming out from the top of the absorber 5 enters into the separation tank 6 through channels.

The separation tank 6 is used for the removal of the liquid water contained in the gas coming out from the top of the absorber 5. The said liquid water is discharged from the outlet at the bottom of the separation tank 6.

After the liquid water is removed, the gas coming out from the top of the separation tank 6 mainly contains huge amount of nitrogen, slight amount of oxygen and slimsy gas water.

The separation tank 6 connects with the drying beds 14 by pipelines; the drying beds 14 connect with the membrane module 15 by pipelines; the mixing tank 17 connects with the down-hole gas injection tube 19 by well head pipelines; and the membrane module 15 connects with the well casing 18 by the nitrogen pressurizer 16 and pipelines.

Filled with solid particle packing materials such as aluminium oxide, silica gel or molecular sieve, the drying beds 14 are composed by connection of two drying-bed spigot groups of the same volume and pipelines. Water is further eliminated out of the gas in the drying beds 14.

Gas coming out from the drying beds 14 enters through pipelines into the membrane module 15, where the contained slight amount of oxygen is removed.

The membrane module 15 refers to nitrogen production system composed of two or more membrane module of the same volume. In the system is filled organic hollow fiber membrane, and the membrane module are in parallel arrangements by spigot groups and pipelines.

Since oxygen is removed, nitrogen with high purity is obtained after the gas has passed through the membrane module 15.

The membrane module 15 connects with well casing 18, and between them is equipped the nitrogen pressurizer 16. The highly pure nitrogen coming from the membrane module 15 is pressurized when passing through the nitrogen pressurizer 16 and then injected into gas injection tube for oil recovery.

The mixing tank 17 connects with gas injection tube for oil recovery 24 by pipelines. With the mixing tank 17, the said reclaimed carbon dioxide and nitrogen from flue gas and the high pressure steam produced from boiler 1 may be matched and mixed at various proportions for injection into gas injection tube for oil recovery 24 for the exploitation of thick crude oil.

As is stated above, the equipment developed by the present invention for the pressurized adsorption of gaseous carbon dioxide from boiler flue gas for oil recovery by well injection is able to efficiently reclaim the carbon dioxide and nitrogen from the flue gas of steam boiler producing steam for well injection. The reclaimed carbon dioxide and nitrogen may be injected into the well for thick crude oil recovery coupled with the steam generated by the boiler. The equipment provided by the invention fully utilizes the exhaust gas produced by the steam boiler for thick crude oil recovery and thereby greatly reduces the cost of thick crude oil recovery.

With the adoption of the equipment provided by the invention, carbon dioxide, nitrogen and high pressure steam may be injected together with various combinations and at different proportions. In this way, technologies for thick crude oil recovery are enriched, enabling oil recovery arts diverse enough for more practical conditions and considerably increasing the exploitation efficiency of thick crude oil wells.

It can also be seen that, the flue gas and the harmful substances contained in it are basically cleaned up after treatment by the equipment of the invention, and thus pollution to the environment is consumedly decreased.

For these reasons, adoption of the equipment provided by the invention may greatly lower the cost as well as increase the efficiency of thick crude oil well exploitation and at the same time reduce obviously the pollution to the environment.

Though the philosophy of the invention is exemplified with the combination of exemplary embodiments, technicians in this field have the right to understand and interpret the structures and various details exemplified in the specific implementary mode as just preferential examples that may realize the object of the invention, and construct, within the essential principle of the invention, on each technical characteristic of the invention various equipotent recombination, revisions or changes, which ought to be within the protected scope of the invention.

What is claimed is:

1. An equipment for the pressurized adsorption of gaseous carbon dioxide from boiler flue gas for oil recovery by well injection, comprising a boiler for generating high pressure steam, a tower scrubber, a carbon dioxide absorber, a flash pot, a purifier, a carbon dioxide pressurizer, a mixing tank configured to enable mixing of gases containing carbon dioxide, nitrogen and steam and a down-hole gas injection tube, wherein:

the purifier obtains higher concentrations of carbon dioxide;

the flue gas outlet at the top of the boiler connects with the tower scrubber by pipelines; the steam outlet at the top of the boiler connects with the mixing tank; the tower scrubber connects with the carbon dioxide absorber by pipelines; the outlet at the bottom of the carbon dioxide absorber connects with the flash pot by pipelines; the flash pot connects with the purifier by pipelines; and the mixing tank connects with the down-hole gas injection tube by well head pipelines, and wherein the purifier comprises two twin purifying beds packed with solid packing materials comprising at least one of aluminum oxide, silica gel, activated carbon or molecular sieve.

2. The equipment for the pressurized adsorption of gaseous carbon dioxide from boiler flue gas for oil recovery by well injection according to claim 1, wherein the boiler connects with a high pressure water pump by pipelines.

3. The equipment for the pressurized adsorption of gaseous carbon dioxide from boiler flue gas for oil recovery by well injection according to claim 1, wherein a compressor is provided between tower scrubber and carbon dioxide absorber.

4. The equipment for the pressurized adsorption of gaseous carbon dioxide from boiler flue gas for oil recovery by well injection according to claim 1, wherein the flash pot connects with a stripper by pipelines; a carbon dioxide compressor is provided between the flash pot and the purifier; the stripper connects with the absorber by a solvent pump and pipelines, and the other side of the stripper connects with an air pump.

5. The equipment for the pressurized adsorption of gaseous carbon dioxide from boiler flue gas for oil recovery by well injection according to claim 1, wherein the outlet at the top of carbon dioxide absorber connects with a nitrogen separation tank by pipelines.

6. The equipment for the pressurized adsorption of gaseous carbon dioxide from boiler flue gas for oil recovery by well injection according to claim 1, comprising drying beds to which a nitrogen separation tank connects by pipelines; the drying beds connects with a membrane module by pipelines; and the membrane module connects with a well casing by a nitrogen pressurizer and pipelines.

7. The equipment for the pressurized adsorption of gaseous carbon dioxide from boiler flue gas for oil recovery by well injection according to any one of claims 1 to 6, wherein the adsorption liquid adopted in absorber is a mixed liquid of one or more solvents selected from the group consisting of polyethylene glycol dimethyl ether, trimethylether, tetramethylene sulfone, propylene carbonate and low temperature methanol or is a mixed liquid of one or more solvents selected from the group consisting of monoethanolamine, methyldiethanolamine, oxidation inhibitor and corrosion inhibitor.

8. An equipment for the pressurized adsorption of gaseous carbon dioxide from boiler flue gas for oil recovery by well injection comprising a boiler for generating high pressure steam, a high pressure water pump, a tower scrubber, a compressor, an absorber, a separation tank, a flash pot, a solvent pump, a stripper, an air pump, a carbon dioxide compressor, a purifier, a carbon dioxide pressurizer, drying beds, a membrane module, a nitrogen pressurizer and a mixing tank configured to enable mixing of gases containing carbon dioxide, nitrogen and steam, wherein:

the bottom of the boiler connects with the high pressure water pump by water-supplying pipes; the purifier obtains higher concentrations of carbon dioxide; the flue gas outlet at the top of the boiler connects with the tower scrubber by pipelines; the steam outlet at the top of the boiler connects with the mixing tank; the tower scrubber connects with the absorber by pipelines interposing with the compressor; the outlets at the top and the bottom of the absorber connect respectively with separation tank and flash pot by pipelines; the flash pot connects respectively with the purifier and the stripper by pipelines; the carbon dioxide compressor is provided between the flash pot and the purifier; the stripper connects with the absorber by the solvent pump and pipelines, and the other side of the stripper connects with the air pump; the separation tank connects with the drying beds by pipelines; the drying beds connects with the membrane module by pipelines; the mixing tank connects with a down-hole gas injection tube by well head pipelines; and the membrane module connects with a well casing by the nitrogen pressurizer and pipelines, and wherein the purifier comprises two twin purifying beds packed with solid packing materials comprising at least one of aluminum oxide, silica gel, activated carbon or molecular sieve.

9. The equipment for the pressurized adsorption of gaseous carbon dioxide from boiler flue gas for oil recovery by well injection according to claim 8, wherein the adsorption liquid adopted in absorber is a mixed liquid of one or more solvents selected from the group consisting of polyethylene glycol dimethyl ether, trimethylether, tetramethylene sulfone, propylene carbonate and low temperature methanol or is a mixed liquid of one or more solvents selected from the group consisting of monoethanolamine, methyldiethanolamine, oxidation inhibitor and corrosion inhibitor.

* * * * *